United States Patent [19]

Hayashi

[11] 4,357,250

[45] Nov. 2, 1982

[54] NITROGEN-CONTAINING TERPOLYMER-BASED COMPOSITIONS USEFUL AS MULTI-PURPOSE LUBRICANT ADDITIVES

[75] Inventor: Katsumi Hayashi, Mentor, Ohio

[73] Assignee: The Lubrizol Corporation, Wickliffe, Ohio

[21] Appl. No.: 294,869

[22] Filed: Aug. 21, 1981

Related U.S. Application Data

[63] Continuation-in-part of Ser. No. 896,864, Apr. 17, 1978, Pat. No. 4,320,019.

[51] Int. Cl.³ ............................................. C10M 1/32
[52] U.S. Cl. ............................................. 252/51.5 A
[58] Field of Search ................................. 252/51.5 A

[56] References Cited

U.S. PATENT DOCUMENTS

| | | | |
|---|---|---|---|
| 3,219,666 | 11/1965 | Norman | 252/51.5 A |
| 3,341,542 | 9/1967 | Lesuer et al. | 252/51.5 A |
| 3,432,479 | 3/1969 | Verdol et al. | 252/51.5 A |
| 4,169,063 | 9/1979 | Kiovsky | 252/51.5 A |
| 4,171,273 | 10/1979 | Waldbillig et al. | 252/51.5 A |
| 4,234,435 | 11/1980 | Meinhardt et al. | 252/51.5 A |
| 4,235,731 | 11/1980 | Kiovsky | 252/51.5 A |

*Primary Examiner*—Arthur P. Demers
*Attorney, Agent, or Firm*—Ronald L. Lyons; John P. Ward; Raymond F. Keller

[57] ABSTRACT

Compositions useful as dispersants and viscosity modifiers in lubricants are produced by (I) preparing an ene reaction intermediate from an olefinic carboxylic acid or derivative thereof (preferably maleic anhydride) and a terpolymer of ethylene, a $C_{3-8}$ α-monoolefin and a non-conjugated diene or triene, and (II) reacting said ene reaction intermediate with a monoamine-polyamine mixture.

30 Claims, No Drawings

NITROGEN-CONTAINING TERPOLYMER-BASED COMPOSITIONS USEFUL AS MULTI-PURPOSE LUBRICANT ADDITIVES

This application is a continuation-in-part of copending application Ser. No. 896,864, filed Apr. 17, 1978, now U.S. Pat. No. 4,320,019.

This invention relates to compositions useful as multi-purpose lubricant additives, to a method for their preparation, and to additive concentrates and lubricants containing them. In its broadest sense, the invention includes oil-soluble compositions prepared by a method which comprises the steps of:

(I) preparing an ene reaction intermediate by reacting, in the absence of free radical initiators, (A) at least one olefinic carboxylic acid or derivative thereof with (B) at least one interpolymer containing
(1) about 10 to about 90 mole percent ethylene units,
(2) about 5 to about 70 mole percent of units derived from at least one $C_{3-8}$ α-monoolefin, and
(3) about 0.1 to about 20 mole percent of units derived from at least one of non-conjugated dienes and trienes,
said interpolymer having an inherent viscosity of at least about 0.3 as measured at 30° C. on a 0.1% by weight solution in carbon tetrachloride; and (II) reacting said ene reaction intermediate with (C) at least one monoamine containing one and only one acylatable moiety per molecule, said acylatable moiety being a primary or secondary amine group; and (D) at least one polyamine containing two or more acylatable moieties;

at least about 70% by weight of the total amines present comprising reagent C.

Prior art additives functioning as viscosity improvers and dispersants have included a variety of nitrogen- and/or oxygen-containing polymeric substances and adducts. Generally, the functionality believed responsible for viscosity improvement is derived from the polymeric nature of the additive as exemplified by its molecular weight (usually high) and morphology (usually amorphous). Dispersancy has been attributed to the additive's nitrogen and/or oxygen-containing moieties.

A typical approach for the preparation of multipurpose additives has been to react a known viscosity index improver with a known dispersant. Often, the resulting product had one or more inferior functionalities. The reason for this is that it is difficult to prepare such additives without sacrificing some important inherent aspects. Typical prior art additives include reaction products of ethylene-propylene copolymers with maleic anhydride and polyamines, of terpolymers of ethylene, propylene and non-conjugated dienes with maleic anhydride and polyamines, and of similar terpolymers with maleic anhydride and polyols.

For review of prior art disclosures concerning multi-purpose additives and particularly viscosity improvers and dispersants, the disclosures of the following U.S. patents are incorporated herein by reference.

| | | |
|---|---|---|
| 2,973,344 | 3,488,049 | 3,799,877 |
| 3,278,550 | 3,513,095 | 3,842,010 |
| 3,311,558 | 3,563,960 | 3,864,098 |
| 3,312,619 | 3,598,738 | 3,864,268 |
| 3,326,804 | 3,615,288 | 3,879,304 |
| 3,403,011 | 3,637,610 | 4,033,889 |
| 3,404,091 | 3,652,239 | 4,051,048 |
| 3,445,389 | 3,687,849 | 4,234,435 |

It is a primary object of this invention to provide novel multi-purpose lubricant additives.

A more specific object is to provide multi-purpose additives directed to improving lubricants' viscosities and dispersancy properties.

A further object is to provide processes for preparing such multi-purpose additives.

Still another object is to provide lubricants having improved dispersancy and viscosity properties.

Other objects will in part be obvious and will in part appear hereinafter.

As will be apparent from the description hereinabove, the oil-soluble compositions of this invention are prepared by a procedure involving two major steps. In step I, (A) at least one olefinic carboxylic acid or derivative thereof is reacted with (B) at least one specifically defined interpolymer.

The olefinic carboxylic acids and derivatives thereof useful as reagent A are well known in the art; they include such acids as acrylic acid, methacrylic acid, maleic acid, fumaric acid, crotonic acid, citraconic acid, itaconic acid and mesaconic acid, as well as their anhydrides, halides and esters (especially the lower alkyl esters, the term "lower alkyl" meaning alkyl groups having up to 7 carbon atoms). The preferred compounds useful as reagent A are the α,β-olefinic carboxylic acids, especially those containing at least two carboxy groups and more especially dicarboxylic acids, and their derivatives. Maleic acid and maleic anhydride, especially the latter, are particularly preferred.

Reagent B is an interpolymer of ethylene (monomer 1) with at least two other monomers (monomers 2 and 3). Monomer 2 is at least one $C_{3-8}$ α-monoolefin, typically having not more than about 5 carbon atoms. The preferred compounds for use as monomer 2 are propylene, 1-butene, 1-pentene and 1-hexene, with propylene being most preferred.

Monomer 3 may be a non-conjugated diene or a triene. Typical trienes are those having two conjugated double bonds and up to about 30 carbon atoms. Illustrative compounds of this type are 1-isopropylidene-3a,4,7,7a-tetrahydroindene, 1-isopropylidenedicyclopentadiene, 5,6-dehydroisodicyclopentadiene and 2-(2-methylene-4-methyl-3-pentenyl)-[2.2.1]bicyclo-5-heptene.

The preferred non-conjugated dienes useful as monomer 3 are those having from 5 to about 14 carbon atoms, and especially those having at least one terminal olefinic bond. The diene may be linear or cyclic. Illustrative suitable dienes are 1,4-hexadiene, 1,5-heptadiene, 1,6-octadiene, 1,4-cyclohexadiene, dicyclopentadiene, 5-methylene-2-norbornene and 5-ethylidene-2-norbornene. Especially preferred is 1,4-hexadiene.

The mole percentages of the various units in the interpolymer are as previously stated. Usually, the interpolymer comprises about 10 to about 90 mole percent (especially about 30 to about 85 and preferably about 30 to about 70 mole percent) ethylene units, about 5 to about 70 mole percent (especially about 15 to about 70 and preferably about 30 to about 70 mole percent) of units derived from monomer 2, and about 0.1 to about 20 mole percent (especially about 1 to about 10 and preferably about 1 to about 5 mole percent) of units derived from monomer 3.

The inherent viscosity of the interpolymer, measured under the temperature and solution conditions previously recited, is at least about 0.3 and preferably between about 0.5 and about 5.0. The inherent viscosity is a measure of the molecular weight of the polymer, but it is often difficult to correlate inherent viscosity with a specific molecular weight. As a general approximation, however, the interpolymers useful as reagent B have a weight average molecular weight ($\overline{M}w$) (or a viscosity average molecular weight, which approximates the weight average figure) between about 30,000 and about 1,000,000, and a ratio of weight average to number average molecular weight ($\overline{M}w/\overline{M}n$) between about 1 and about 8. Particularly useful are the interpolymers of this type which are prepared in amorphous form.

A number of interpolymers suitable for use as reagent B are commercially available. Those which are especially preferred contain about 40 to about 60 mole percent ethylene units, about 40 to about 60 mole percent propylene units, and about 2 to about 10 mole percent 1,4-hexadiene units. Examples thereof are "Ortholeum 2052" and "PL-1256" available from E. I. duPont deNemours and Co. The former is a terpolymer containing about 48 mole percent ethylene units, 48 mole percent propylene units and 4 mole percent 1,4-hexadiene units, having an inherent viscosity under the recited conditions of 1.35. The latter is a similar polymer with an inherent viscosity of 1.95. The viscosity average molecular weights of the two are on the order of 200,000 and 280,000, respectively.

The reaction of step I of the method of this invention is carried out by merely blending reagents A and B in the desired proportions and heating, typically in an inert atmosphere, at a suitable reaction temperature, typically up to about 250° C. If desired, the reaction may be effected in a substantially inert, normally liquid organic diluent. Mineral oil is a preferred diluent, but other diluents (such as the synthetic lubricating oils described hereinafter) may also be used.

The reaction of step I is an "ene reaction." This is a known reaction between olefinic compounds and dienophiles which may be schematically represented by the following equation in which each of R, R' and R'' may be hydrogen or an organic radical and the dienophile (reagent A) is maleic anhydride:

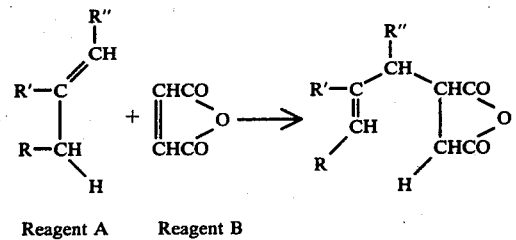

Reagent A     Reagent B

Since reagent B typically contains a number of olefinic sites derived from monomer 3, it is possible to incorporate more than one moiety derived from reagent A on each molecule of reagent B provided the reactant ratios are favorable. No free radical initiator is required for the ene reaction to take place, and none is contemplated for use in the method of this invention.

In step II of the method of this invention, the ene reaction intermediate formed in step I is further reacted with at least two amines, identified herein as reagents C and D. Reagent C is a monoamine in which the sole acylatable moiety per molecule is a primary or secondary amine group. Such amines may be represented by the formula

wherein R is a hydrocarbon-based radical and $R^1$ is hydrogen or a hydrocarbon-based radical.

As used herein, the term "hydrocarbon-based radical" denotes a radical having a carbon atom directly attached to the amine nitrogen atom and having predominantly hydrocarbon character within the context of this invention. Such radicals include the following:

(1) Hydrocarbon radicals; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, R and $R^1$ may together form an alicyclic radical). Such radicals are known to those skilled in the art; examples are methyl, ethyl, propyl, hexyl, decyl, phenyl, tolyl, benzyl, cyclopentyl and cyclohexyl (all isomers being included).

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are hydroxy, alkoxy (especially lower alkoxy), mercapto, alkylthio (especially lower alkylthio), nitro and sulfoxy.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbon-based radical.

Preferably, the hydrocarbon-based radicals in reagent C are free from acetylenic unsaturation.

Amines suitable for use as reagent C include alkylamines such as methylamine, ethylamine, propylamine, dodecylamine, octadecylamine, methylethylamine, methyloctylamine and dibutylamine; alicyclic amines such as cyclohexylamine; aromatic amines such as aniline, ditolylamine and naphthylamines; and heterocyclic amines such as pyrrolidine, aminopyridines, phenothiazine, alkyloxazolidines and N-aminoalkylmorpholines. The preferred amines are the alkylamines and N-aminoalkylmorpholines, with N-(3-aminopropyl)morpholine being particularly preferred.

Reagent D is at least one polyamine containing two or more acylatable moieties. Among the polyamines are alkylene polyamines including those having the formula

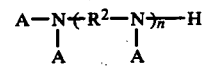

wherein n is an integer between about 1 and 10, preferably between 2 and 8; each A is independently hydrogen or a hydrocarbon or hydroxy-substituted hydrocarbon radical having up to about 30 atoms; and $R^2$ is a divalent hydrocarbon radical having about 1–18 carbons. Preferably A is an aliphatic radical of up to about 10 carbon atoms which may be substituted with one or two hydroxy groups, and $R^2$ is a lower alkylene radical having 1–10, preferably 2–6, carbon atoms. Especially preferred are the alkylene polyamines wherein each A is hydrogen. Such alkylene polyamines include methylene polyamines, ethylene polyamines, butylene polyamines, propylene polyamines, pentylene polyamines, hexylene polyamines and heptylene polyamines. The higher homologs of such amines and related aminoalkyl-substituted piperazines are also included. Specific examples of such polyamines include ethylene diamine, triethylene tetramine, tris(2-aminoethyl)amine, propylene diamine, trimethylene diamine, hexamethylene diamine, decamethylene diamine, octamethylene diamine, di(-heptamethylene) triamine, tripropylene tetramine, tetraethylene pentamine, trimethylene diamine, pentaethylene hexamine, di(trimethylene) triamine, 2-heptyl-3-(2-aminopropyl)imidazoline, 1,3-bis(2-aminoethyl)imidazoline, 1-(2-aminopropyl)piperazine, 1,4-bis(2-aminoethyl)piperazine and 2-methyl-1-(2-aminobutyl)-piperazine. Higher homologs, obtained by condensing two or more of the above-illustrated alkylene amines, are also useful.

The ethylene polyamines are especially useful as reagent D for reasons of cost and effectiveness. Such polyamines are described in detail under the heading "Diamines and Higher Amines" in Kirk-Othmer, *Encyclopedia of Chemical Technology*, Second Edition, Vol. 7, pp. 22–39. They are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines. Because of their availability, these mixtures are particularly useful in preparing the compositions of this invention. Satisfactory products can also be obtained by the use of pure ethylene polyamines.

Hydroxy polyamines, e.g., alkylene polyamines having one or more hydroxyalkyl substituents on the nitrogen atoms, are also useful as reagent D. Preferred hydroxyalkyl-substituted alkylene polyamines are those in which the hydroxyalkyl group has less than about 10 carbon atoms. Examples of such hydroxyalkyl-substituted polyamines include N-(2-hydroxyethyl)ethylene diamine, N,N'-bis(2-hydroxyethyl)ethylene diamine, 1-(2-hydroxyethyl)piperazine, monohydroxypropyl-substituted diethylene triamine, dihydroxypropyltetraethylene pentamine and N-(3-hydroxybutyl)tetramethylene diamine. Higher homologs obtained by condensation of the above-illustrated hydroxyalkyl-substituted alkylene amines through amino or hydroxy radicals are likewise useful.

As previously mentioned, reagent C comprises at least about 70% by weight of the amines used in step II. The proportion of reagent C in the mixture is usually at least about 80% and preferably between about 80% and about 95%.

The reaction of step II may be effected by merely heating the two reagents at a temperature between about 100° C. and about 250° C., preferably from about 150° to about 225° C., for a period of time sufficient to complete the reaction to the desired extent. The ratio of equivalents of ene reaction intermediate to amines is generally from about 1:1 to about 2:1. If the ratio is greater than 2:1 or less than 1:1, excess carboxylic acid or derivative or excess amine (respectively) merely remain in the reaction product with little, if any, effect.

Reagents C and D may be introduced sequentially into the reaction mixture, but are preferably introduced as a blend. It is frequently advantageous to add them incrementally so as to avoid foaming. It may also be advantageous to carry out the reaction in the presence of a substantially inert, normally liquid organic diluent, such as one of those previously enumerated, preferably mineral oil.

The reaction may be followed by procedures known in the art to determine completion. One convenient method, when the ene reaction intermediate of step I is an anhydride, is to take infrared spectra periodically and observe the size of the anhydride band, which decreases as the reaction proceeds to completion. Another method is to read the acid number periodically, stopping the reaction when the desired acid number is obtained.

The preparation of the compositions of this invention is illustrated by the following examples. All parts and percentages are by weight.

EXAMPLES 1–3

A mixture of 73 parts (0.75 mole) of maleic anhydride and 7799 parts of an 11.5% solution of "Ortholeum 2052" in mineral oil, containing 0.15% butylated hydroxytoluene (895 parts or 0.5 mole of "Ortholeum 2052") is heated for 15 hours at 240° C., with stirring. There are then added 1165 parts of mineral oil; 134 parts of "Super Filtrol," an acid-treated clay; and 89 parts of a filter aid material. Heating is continued for 8 hours at 130° C. The mixture is then filtered; the filtrate is an oil solution of the desired ene reaction intermediate.

To 500 parts of the ene reaction intermediate solution is added incrementally at about 180° C., with stirring, 4 parts of a mixture of N-(3-aminopropyl)morpholine and a commercial ethylene polyamine mixture containing an average of about 3–7 amino groups per molecule. Heating and stirring are continued, with the reaction periodically being monitored by taking infrared spectra. The desired product has been obtained when the anhydride peak in the spectrum has disappeared. The products are obtained as 10% solutions in mineral oil; details thereof are listed in the following table.

| Example | % N—(3-aminopropyl)morpholine in amine mixture | % N in product |
|---|---|---|
| 1 | 95 | 0.15 |
| 2 | 89 | 0.15 |
| 3 | 85 | 0.15 |

EXAMPLE 4

A solution of 700 parts of "PL-1256," 80 parts of maleic anhydride and 14 parts of butylated hydroxytoluene in 8050 parts of mineral oil is heated under nitrogen at 260° C., with stirring, for 9 hours. The mixture is then blown with nitrogen at 240° C. for 2½ hours, and filtered after the addition of 220 parts of filter aid. The filtrate is an 8% solution in mineral oil of the desired ene reaction intermediate.

To 6652 parts of the ene reaction intermediate solution is added incrementally at 180° C. under nitrogen, with stirring, a mixture of 56 parts of N-(3-aminopropyl)morpholine and 10.7 parts of the ethylene polyamine mixture of Examples 1-3. Stirring and heating at 180° C. are continued for 2½ hours. The desired product is obtained as an 8% solution in mineral oil.

As previously indicated, the compositions of this invention are useful as additives for lubricants, in which they function primarily as dispersants and viscosity modifiers. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, and the like. The compositions can also be used in gas engines, stationary power engines and turbines and the like. Automatic transmission fluids, transaxle lubricants, gear lubricants, metal-working lubricants, hydraulic fluids and other lubricating oil and grease compositions can also benefit from the incorporation therein of the compositions of this invention.

Natural oils include liquid petroleum oils and solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halo-substituted hydrocarbon oils such as polymerized and interpolymerized olefins [e.g., polybutylenes, polypropylenes, propylene-isobutylene copolymers, chlorinated polybutylenes, poly(1-hexenes), poly(1-octenes), poly(1-decenes)]; alkylbenzenes [e.g., dodecylbenzenes, tetradecylbenzenes, dinonylbenzenes, di(2-ethylhexyl)benzenes]; polyphenyls (e.g., biphenyls, terphenyls, alkylated polyphenyls); and alkylated diphenyl ethers and alkylated diphenyl sulfides and the derivatives, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-polyisopropylene glycol ether having an average molecular weight of 1000, diphenyl ether of polyethylene glycol having a molecular weight of 500-1000, diethyl ether of polypropylene glycol having a molecular weight of 1000-1500); and mono- and polycarboxylic esters thereof, for example, the acetic acid esters, mixed $C_3$-$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl) silicate, tetra-(4-methyl-2-ethylhexyl) silicate, tetra-(p-tert-butylphenyl) silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Generally, the lubricants of the present invention contain an amount of the composition of this invention sufficient to disperse insoluble impurities and improve viscosity properties. Normally this amount will be from about 0.01% to about 10%, preferably from about 1% to about 5%, by weight.

The invention also contemplates the use of other additives in combination with the compositions of this invention. Such additives include, for example, auxiliary detergents and dispersants of the ash-producing or ashless type, corrosion- and oxidation-inhibiting agents, pour point depressing agents, extreme pressure agents, color stabilizers and anti-foam agents.

The ash-producing detergents are exemplified by oil-soluble neutral and basic salts of alkali or alkaline earth metals with sulfonic acids, carboxylic acids, and organic phosphorus acids characterized by at least one direct carbon-to-phosphorus linkage including those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenols, thiophenol, sulfurized alkylphenols, and condensation products of formaldehyde with phenolic substances; alcohols such as methanol, 2-propanol, octyl alcohol, Cellosolve, Carbitol, ethylene glycol, stearyl alcohol and cyclohexyl alcohol; and amines such as aniline, phenylenediamine, phenothiazine, phenyl-$\beta$-naphthylamine and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Auxiliary ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amine, organic hydroxy compounds such as phenols and alcohols, and/or basic inorganic materials. Examples of these "carboxylic dispersants" are described in many U.S. Pat. Nos. including 3,272,746; 3,381,022; and 4,234,435.

(2) Reaction products of relatively high molecular weight aliphatic or alicyclic halides with amines, preferably polyalkylene polyamines. These may be characterized as "amine dispersants" and examples thereof are described for example, in U.S. Pat. Nos. 3,275,554; 3,438,757; 3,454,555; and 3,565,804.

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in U.S. Pat. Nos. 3,368,972; 3,413,347; and 3,980,569 are illustrative.

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in a number of U.S. patents.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in U.S. Pat. Nos. 3,329,658; 3,449,250; 3,519,565; 3,666,730; 3,687,849; and 3,702,300.

All of the above-noted patents are incorporated by reference herein for their disclosures of ashless dispersants.

Extreme pressure agents and corrosion- and oxidation-inhibiting agents are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl oleate, sulfurized alkylphenols, sulfurized dipentene, and sulfurized terpenes; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite and diisobutyl-substituted phenyl phosphite; metal thiocarbamates such as zinc dioctyldithiocarbamate and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The compositions of this invention can be added directly to the lubricant. Preferably, however, they are diluted with a substantially inert, normally liquid organic diluent such as mineral oil, naphtha, benzene, toluene or xylene, to form an additive concentrate. These concentrates usually contain from about 5% to about 90% by weight of the composition of this invention and may contain, in addition, one or more other additives known in the art or described hereinabove.

Illustrative lubricants of this invention are listed in the following table. All amounts other than for mineral oil and the products of Examples 2 and 4 are exclusive of mineral oil used as diluent.

| | | Parts by Weight | | |
|---|---|---|---|---|
| Ingredient | Lubricant | A | B | C |
| Mineral oil | | 75.52 | 90.19 | 81.56 |
| Product of Example 2 | | — | 7.00 | — |
| Product of Example 4 | | 9.00 | — | 14.80 |
| Polybutenyl (mol. wt. about 2000) succinic anhydride-ethylene polyamine reaction product | | 1.94 | — | — |
| Polybutenyl (mol. wt. about 1000) succinic anhydride-pentaerythritol-ethylene polyamine reaction product | | — | 1.10 | 1.18 |

-continued

| Ingredient | Lubricant | Parts by Weight | | |
|---|---|---|---|---|
| | | A | B | C |
| Basic calcium petroleum sulfonate | | 0.53 | 0.67 | 0.88 |
| Basic sodium petroleum sulfonate | | 0.42 | — | — |
| Zinc dialkylphosphorodithioate | | 1.48 | 0.84 | 1.14 |
| Synthetic sulfurized sperm oil substitute | | 1.11 | — | — |
| Sulfurized alkyl cyclohexenecarboxylate | | — | 0.20 | 0.27 |
| Dialkyl fumrate-vinyl acetate-vinyl ether terpolymer | | — | — | 0.17 |
| Silicone antifoam agent | | 0.008 | 0.007 | 0.007 |

What is claimed is:

1. A method for preparing an oil-soluble composition which comprises the steps of:
   (I) preparing an ene reaction intermediate by reacting, in the absence of free radical initiators,
      (A) at least one olefinic carboxylic acid or derivative thereof with
      (B) at least one interpolymer containing
         (1) about 10 to about 90 mole percent ethylene units,
         (2) about 5 to about 70 mole percent of units derived from at least one $C_{3-8}$ α-monoolefin, and
         (3) about 0.1 to about 20 mole percent of units derived from at least one of non-conjugated dienes and trienes,
      said interpolymer having an inherent viscosity of at least about 0.3 as measured at 30° C. on a 0.1% by weight solution in carbon tetrachloride; and
   (II) reacting said ene reaction intermediate with
      (C) at least one monoamine containing one and only one acylatable moiety per molecule, said acylatable moiety being a primary or secondary amine group; and
      (D) at least one polyamine containing two or more acylatable moieties;
   at least about 70% by weight of the total amines present comprising reagent C.

2. A method according to claim 1 wherein the (3) units in reagent B are derived from at least one triene having up to about 30 carbon atoms and two conjugated double bonds.

3. A method according to claim 2 wherein the (2) units in reagent B are derived from at least one $C_{3-5}$ α-monoolefin.

4. A method according to claim 3 wherein reagent B has an inherent viscosity of about 0.5 to about 5.0, the (2) units therein are derived from propylene, and the (3) units are derived from at least one of 1-isopropylidene-3a,4,7,7a-tetrahydroindene, 1-isopropylidenedicyclopentadiene, 5,6-dehydroisodicyclopentadiene and 2-(2-methylene-4-methyl-3-pentenyl)-[2.2.1]bicyclo-5-heptene.

5. A method according to claim 4 wherein reagent A is at least one of acids containing at least two carboxy groups and lower alkyl esters, halides and anhydrides thereof.

6. A method according to claim 5 wherein the (3) units in reagent B comprise about 1 to about 10 mole percent thereof.

7. A method according to claim 6 wherein reagent B contains (1) about 30 to about 70 mole percent ethylene units, (2) about 30 to about 70 mole percent propylene units, and (3) about 1 to about 5 mole percent triene units.

8. A method according to claim 7 wherein reagent A is an α,β-olefinic dicarboxylic acid or an anhydride thereof.

9. A method according to claim 8 wherein reagent D is at least on alkylene polyamine.

10. A method according to claim 9 wherein reagent A is maleic anhydride.

11. A method according to claim 10 wherein reagent C is at least one N-(aminoalkyl)morpholine.

12. A method according to claim 11 wherein reagent C is N-(3-aminopropyl)morpholine.

13. A method according to claim 11 wherein reagent D is at least one ethylene polyamine.

14. A method according to claim 1 wherein the (3) units in reagent B are derived from at least one non-conjugated diene containing from 5 to about 14 carbon atoms.

15. A method according to claim 14 wherein the (2) units in reagent B are derived from at least one monoolefin containing 3 to about 8 carbon atoms.

16. A method according to claim 15 wherein reagent B has an inherent viscosity of about 0.5 to about 5.0, the (2) units therein are derived from propylene, and the (3) units are derived from at least one of 1,4-hexadiene, 1,5-heptadiene, 1,6-octadiene, 1,4-cyclohexadiene, dicyclopentadiene, 5-methylene-2-norbornene and 5-ethylidene-2-norbornene.

17. A method according to claim 4 wherein reagent A is at least one of acids containing at least two carboxy groups and lower alkyl esters, halides and anhydrides thereof.

18. A method according to claim 5 wherein the (3) units in reagent B comprise about 1 to about 10 mole percent thereof.

19. A method according to claim 6 wherein reagent B contains (1) about 30 to about 70 mole percent ethylene units, (2) about 30 to about 70 mole percent propylene units, and (3) about 1 to about 5 mole percent diene units.

20. A method according to claim 7 wherein reagent A is an α,β-olefinic dicarboxylic acid or an anhydride thereof.

21. A method according to claim 8 wherein reagent D is at least one alkylene polyamine.

22. A method according to claim 9 wherein reagent A is maleic anhydride.

23. A method according to claim 10 wherein reagent C is at least one N-(aminoalkyl)morpholine.

24. A method according to claim 11 wherein reagent C is N-(3-aminopropyl)morpholine.

25. A method according to claim 11 wherein reagent D is at least one ethylene polyamine.

26. A method according to claim 25 wherein the (3) units in reagent B are derived from 1,4-hexadiene.

27. A method for preparing an oil-soluble composition which comprises the steps of:

(I) preparing an ene reaction intermediate by reacting, in the absence of free radical initiators and at a temperature from about 180° to about 250° C., (A) maleic anhydride with (B) at least one interpolymer containing (1) about 40 to about 60 mole percent ethylene units, (2) about 40 to about 60 mole percent propylene units, and (3) about 2 to about 10 mole percent 1,4-hexadiene units, said interpolymer having an inherent viscosity of about 0.5 to about 5.0 as measured at 30° C. on a 0.1% by weight solution in carbon tetrachloride; and (II) reacting said ene reaction intermediate at a temperature between about 100° and about 280° C. with a mixture of (C) N-(3-aminopropyl)morpholine and (D) at least one ethylene polyamine, said mixture comprising at least about 80% by weight of N-(3-aminopropyl)morpholine.

28. A composition prepared by the method of any one of claim 1–27.

29. An additive concentrate comprising a substantially inert, normally liquid organic diluent and about 5% to about 90% by weight of a composition according to claim 28.

30. A lubricant composition comprising a major amount of a lubricating oil and a minor amount of a composition according to claim 28.

* * * * *